United States Patent [19]

Wilson

[11] Patent Number: 4,679,342

[45] Date of Patent: Jul. 14, 1987

[54] MEANS FOR RENDERING CONTROLS TACTUALLY-SENSITIVE

[76] Inventor: Donna Wilson, Village Green, Building 15, Apt. 89, Hazlet, N.J. 07730

[21] Appl. No.: 803,236

[22] Filed: Dec. 2, 1985

[51] Int. Cl.⁴ .............................................. G09F 18/00
[52] U.S. Cl. ....................................... 40/616; 434/12; 40/337
[58] Field of Search ............... 40/616, 2, 337; 434/12, 434/13

[56] References Cited

U.S. PATENT DOCUMENTS 1,523,828  9/1950  Howe ................................. 434/112
1,718,694  6/1929  Kurowski ........................... 434/113
3,193,625  7/1965  Triplett .................................. 40/337
4,404,764  9/1983  Willis et al. ......................... 40/124.1

*Primary Examiner*—Gene Mancene
*Assistant Examiner*—Wenceslao J. Contreras
*Attorney, Agent, or Firm*—Stanley W. Sokolowski

[57] ABSTRACT

The invention is a flexible, plastic sheet which, in one embodiment thereof, is uniplanar and has tactually-sensitive indicia fixed thereon, and adhesive strips are arrayed in adjacency to edges thereof. The sheet is adhesively emplaced over the only visually-sensitive or visually-discriminatory controls on a control panel to render the controls tactually-sensitive or tactually-discriminatory.

6 Claims, 5 Drawing Figures

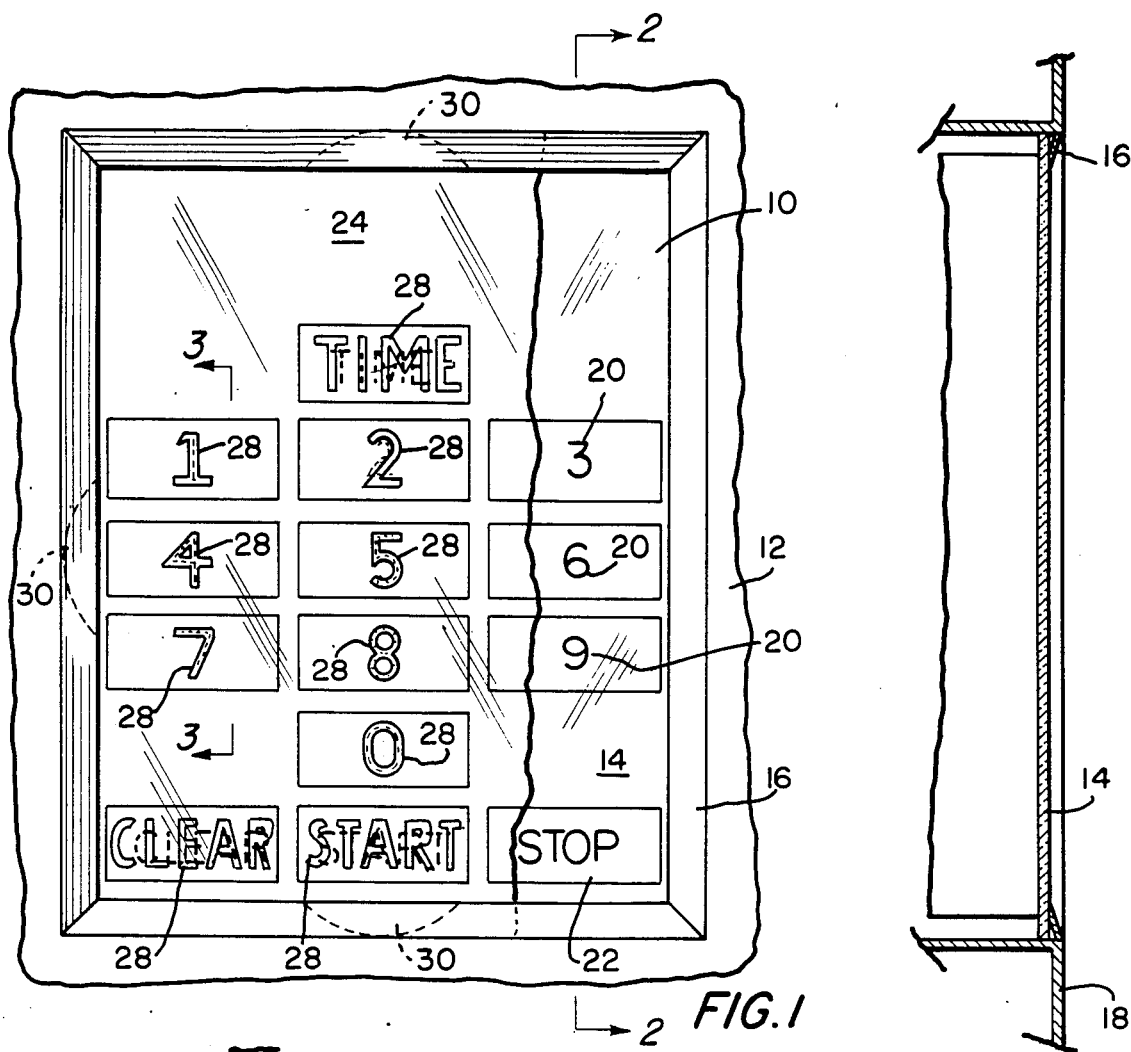
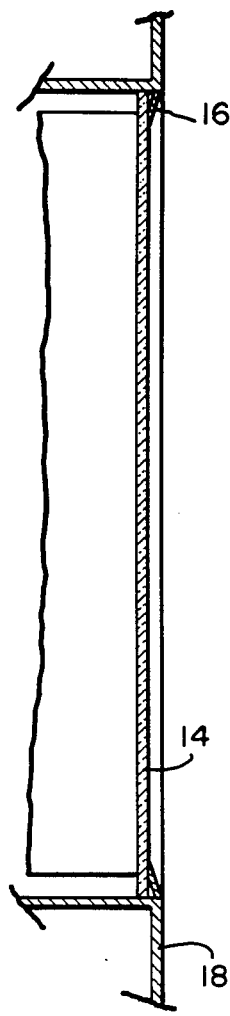
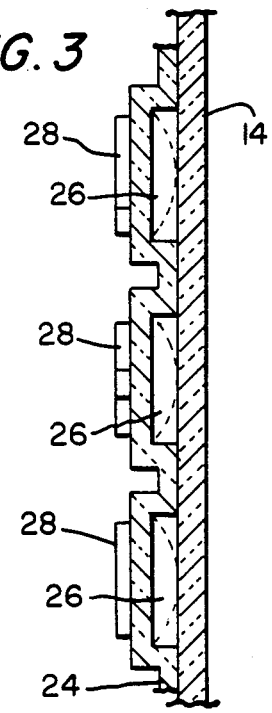
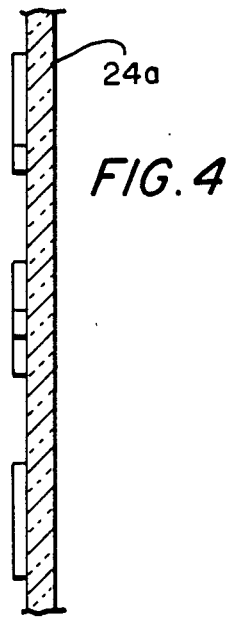
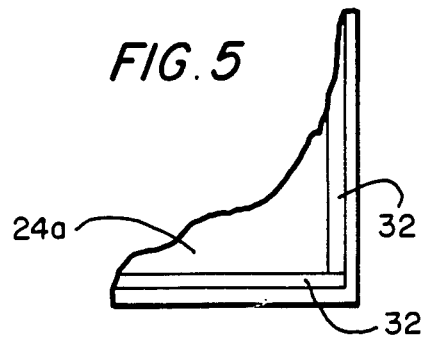

MEANS FOR RENDERING CONTROLS TACTUALLY-SENSITIVE

This invention pertains to controls for equipment, such as microwave ovens, washing machines, and the like, which are visually-sensitive or visually discriminatory, and in particular to means for rendering such controls tactually-sensitive or tactually discriminatory.

Appliances, equipment, and the like, commonly have control panels which have depressible buttons, or legends, which are used to turn on and off the appliance or device, and to control the operation thereof. There are television receivers, for instance, which have flat, unitized panels with indicia represented thereon denoting "On" and "Off", "Volume", etc. One has only to touch the indicia to turn the television receiver On or Off, or to regulate the Volume thereof. Commonly, too, microwave ovens have such control panels. The latter have indicia visible on or through a flat, unitized panel, and an operator can start and/or stop the oven by touching numerals visibly displayed on or through the control panel.

Those who have impaired vision, however, are unable to operate and/or control such visually-sensitive or visually-discriminatory appliances. There has been a need for some facile means for converting such only visually-sensitive control panels to tactually-sensitive control panels, in order that the sight-impaired can, with safety, use appliances which have such control panels.

It is an object of this invention to set forth, for a control panel of a given configuration comprising a given area, and having discrete, visually-sensitive or visually-discriminatory controls set out thereon in a prescribed pattern, means for rendering said controls tactually-sensitive or tactually-discriminatory, comprising a sheet having a configuration substantially indentical to said given configuration and encompassing at least an area equal to said given area; said sheet having discrete, tactually-sensitive or tactually-discriminatory indicia thereon in said prescribed pattern; and said sheet further having means for emplacement thereof upon said control panel and surmountingly over said visually-sensitive or visually-discriminatory controls.

Further objects of this invention, as well as the novel features thereof, will become more apparent, by reference to the following description, taken in conjunction with the accompanying figures, in which:

FIG. 1 is a vertical illustration of a microwave oven control panel over which the novel invention, in an embodiment thereof, is emplaced; a portion of the inventive sheet is cut-away, only to show the underlying, visually-sensitive or -discriminatory panel;

FIG. 2 is a cross-sectional view taken along section 2—2 of FIG. 1;

FIG. 3 is a cross-sectional view taken along section 3—3 of FIG. 1;

FIG. 4 is a cross-sectional view, similar to that of FIG. 3, of an alternative embodiment of the invention; and FIG. 5 is a fragmentary illustration of one corner of the sheet of the alternative embodiment of FIG. 4, the same showing the rear surface of the sheet corner only.

As shown in the figures, the control panel 10 of a microwave oven (shown for exemplary purposes only) 12 comprises a transparent window 14 which is held in a bezel 16 in a frame 18 of the oven. The panel 10 has a plurality of rectangular outlines formed thereon within which are indicia—numerals 20 or words 22—which constitute the controls of the oven. As is well known in the microwave oven art, one has only to touch the window 14, over the desired numeral or word, to effect a control of the oven 12. However, the indicia are only visually-sensitive or visually-discriminatory. If the numerals 20 or words 22 cannot be discerned, in that one is sight-impaired, it is not possible safely to operate the oven. Accordingly, the invention converts the only visually-sensitive indicia to tactually-sensitive indicia.

An overlying sheet 24 is fixed in place over the window 14. Sheet 24 has a plurality of relieved pockets 26 formed therein upon which are cemented indicia 28. The sheet 24 is formed of thin, flexible plastic material, and so are the indicia 28. Therefore, upon one pressing upon the indicia 28, the pockets 26 freely deform, to bring the pressure to bear upon the underlying window 14. Here the controls—the indicia 20 and 22—are simply displayed through the window 14. In appliances, however, where the controls are prominent buttons, the latter are simply received in the pockets 26 of the sheet 24.

The indicia 28 are tactually-sensitive, in that they are cut-outs having a tactually-readable depth. The indicia 28 are shown as arabic numerals and english words, but the former could be in Braille, and the latter could be in Braille, or foreign-language words, etc.

On the four sides of the sheet 24 are formed hemispheric tabs 30. These are used to fix the sheet 24 in place on the window 14. By pressing, gently, against the window 14, it is possible to expose a minute clearance between the window 14 and the bezel 16. This is done at all four sides of the window 14, and the tabs 30 are inserted into the exposed clearances.

Where the appliance involved has only a flat surface as the control panel 10, it is sufficient to provide a sheet 24a (as in FIG. 4) upon which are cemented the tactually-readable indicia 28. Additionally, there are appliances in which it is not possible to open a clearance between the window 14 of the control panel thereof and the bezel 16. In such circumstances, it is only necessary to provide the sheet 24a (or 24) with strips 32 of adhesive on the rear surface thereof. Then, by positioning the sheet 24a (or 24) properly on the window 14, it can be made to adhere. Patently, the sheets 24a (or 24) can also be cemented in place on the windows 14.

From appliance to appliance, and from one manufacturer's product to another, the control panels vary, of course. To practice the invention, however, it is only required to prepare sheets 24(or 24a) which conform, generally or substantially to the configuration of the control panel of the appliance, and encompass a like area, and set out thereon tactually-sensitive indicia in the same pattern as on the control panel of the appliance.

While I have described my invention, in connection with specific embodiments thereof, it is to be clearly understood that this is done only by way of example, and not as a limitation to the scope of my invention, as set forth in the objects thereof, and in the appended claims.

I claim:

1. For a control panel of a given configuration comprising a given area, and having discrete, and only visually-sensitive or visually-discriminatory controls set out thereon in a prescribed pattern of lettered words and Arabic numerals, means for rendering said words and numerals tactually-sensitive or tactually-discriminatory, comprising:

a sheet having a configuration substantially identical to said given configuration, and encompassing at least an area equal to said given area;

said sheet having discrete, tactually-sensitive or tactually-discriminatory indicia thereon in said same prescribed pattern; and said sheet further having means for emplacement thereof upon said control panel and surmountingly over said visually-sensitive controls; wherein said indicia literally correspond to said words and said numerals.

2. Means for rendering controls tactually-sensitive, according to claim 1, wherein:
said sheet is substantially uni-planar; and
said indicia are fixed onto said sheet.

3. Means for rendering controls tactually-sensitive, according to claim 1, wherein:
said sheet has a plurality of relieved surfaces formed thereon; and
said indicia are fixed on said relieved surfaces.

4. Means for rendering controls tactually-sensitive, according to claim 1, wherein:
said emplacement means comprises tabs extending from said sheet for insertion thereof into edges of said panel.

5. Means for rendering controls tactually-sensitive, according to claim 1, wherein:
said emplacement means comprises adhesive strips fixed in adjacency to edges of said sheet.

6. Means for rendering controls tactually-sensitive, according to claim 4, wherein:
said control panel has a uniplanar display panel;
said display panel is supported within a bezel; and
said tabs comprise means for slidably interpositioning between said bezel and edges of said display panel.

* * * * *